United States Patent [19]

Matsuyama

[11] Patent Number: 4,561,754
[45] Date of Patent: Dec. 31, 1985

[54] VOLTAGE CONTROL APPARATUS FOR A CAMERA

[75] Inventor: Shinichi Matsuyama, Kanagawa, Japan

[73] Assignee: Canon Kabushiki Kaisha, Tokyo, Japan

[21] Appl. No.: 700,685

[22] Filed: Feb. 12, 1985

[51] Int. Cl.$^4$ ............................................... G03B 7/26
[52] U.S. Cl. ................................................. 354/484
[58] Field of Search ............ 354/418, 464, 484, 173.1, 354/173.11

[56] References Cited

U.S. PATENT DOCUMENTS

| | | | |
|---|---|---|---|
| 4,216,379 | 8/1980 | Genesi | 354/464 |
| 4,278,337 | 7/1981 | Mashimo | 354/173.11 |
| 4,329,036 | 5/1982 | Maidu | 354/484 |
| 4,472,041 | 9/1984 | Carcia et al. | 354/418 |

Primary Examiner—Russell E. Adams
Attorney, Agent, or Firm—Toren, McGeady, Stanger, Goldberg & Kiel

[57] ABSTRACT

The disclosed apparatus controls the voltage of a camera power supply that drives a heavy load such as a motor. When the motor or other power consuming element is operated, a voltage step-up component supplies the camera's electronic circuitry with a stepped-up voltage. After the operation of the motor or other element is completed, operation of the voltage step-up component continues until the voltage of the power source achieves a predetermined value. Operation of the voltage step-up component then stops.

14 Claims, 9 Drawing Figures

VOLTAGE CONTROL APPARATUS FOR A CAMERA

BACKGROUND OF THE INVENTION

1. Field of the Invention

The present invention relates to a voltage control apparatus for a camera having a high load construction such as a motor.

2. Description of the Prior Art

Motors have been build into or mounted on cameras for automatically feeding film through the camera. In these cameras, the heavy load which results when the motor feeds film lowers the power source's voltage. No problems exist when the power source is large enough to handle such a high load. However, when the capacity of the power source is small, as in the battery for a compact camera, the voltage drop under the heavy load causes erroneous operation of the electronic circuit that controls the camera's other functions.

In order to solve this problem, a voltage step-up arrangement such as a DC/DC converter can be provided to supply the camera's electronic circuitry with the necessary voltage. In one known system, the voltage step-up component is controlled always to operate with the power source from the time it is switched on. A problem exists with this system in that the consumption of the power source is large, due to the current consumption in the voltage step-up component and the motor, even when no high load is placed on the power source.

It has also been suggested to operate the voltage step-up component only when there is a high load from the motor. However, in a compact camera, the number of batteries used is small and therefore the capacity of the power source is also small. Additionally, it takes some time for the decreased voltage level due to the power source consumption to be restored after the release of the load. The battery voltage cannot be restored immediately up to the predetermined proper voltage when the operation of the voltage step-up component is stopped at the same time as the motor. Thus, erroneous operation of the electronic circuit for controlling the camera's efficiency is possible.

SUMMARY OF THE INVENTION

It is, accordingly, an object of the present invention to provide a voltage control apparatus for a camera using a heavy electrical load such as a film-feeding motor feeding film, so that even if the capacity of the power source is small or if the power source is consumed, the exposure control of the electronic circuit for cntrolling the camera's efficiency such as the motor control, can be operated correctly without increasing the current.

Other purposes or features of the present invention will become apparent from the following detailed description.

DETAILED DESCRIPTION OF THE PREFERRED EMBODIMENTS

Below, various embodiments of the present invention will be described with reference to the accompanying drawings.

Figure 1:
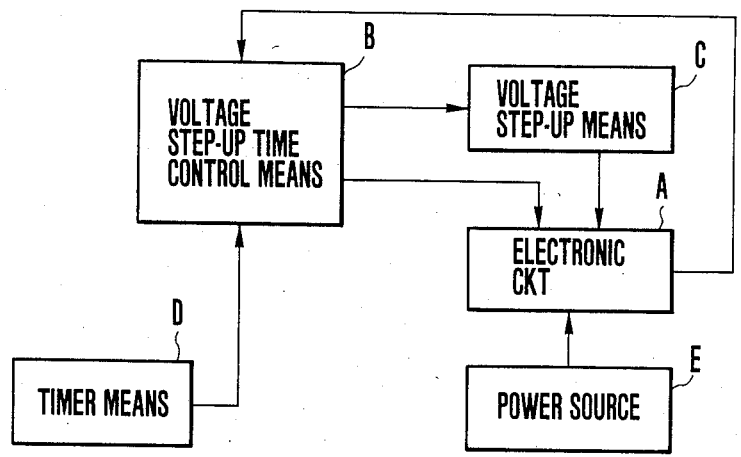
FIG. 1 is an efficiency block diagram showing the construction of a first embodiment of the present invention.

FIG. 1 is an efficiency block diagram showing the compositon of the first embodiment of the present invention, whereby operation of the motor for driving the film feeding system is controlled by the operation of the electronic circuit A, which controls the efficiency of the camera, in such a manner that in association with the start-up operation of the motor the voltage step-up time control element B is ordered to start stepping-up the voltage. The voltage step-up time control element B then actuates the voltage step-up element C to deliver the stepped up voltage to the electronic circuit A. The voltage step-up time control element B then continues to operate the voltage step-up element C with the timer even after the driving of the film feeding system is completed. Then, the motor and the voltage step-up element C stop operation after a lapse of time of the timer D. After that, a voltage whose level has been restored to a predetermined value is delivered from the battery E to the electronic circuit A.

Figure 2:
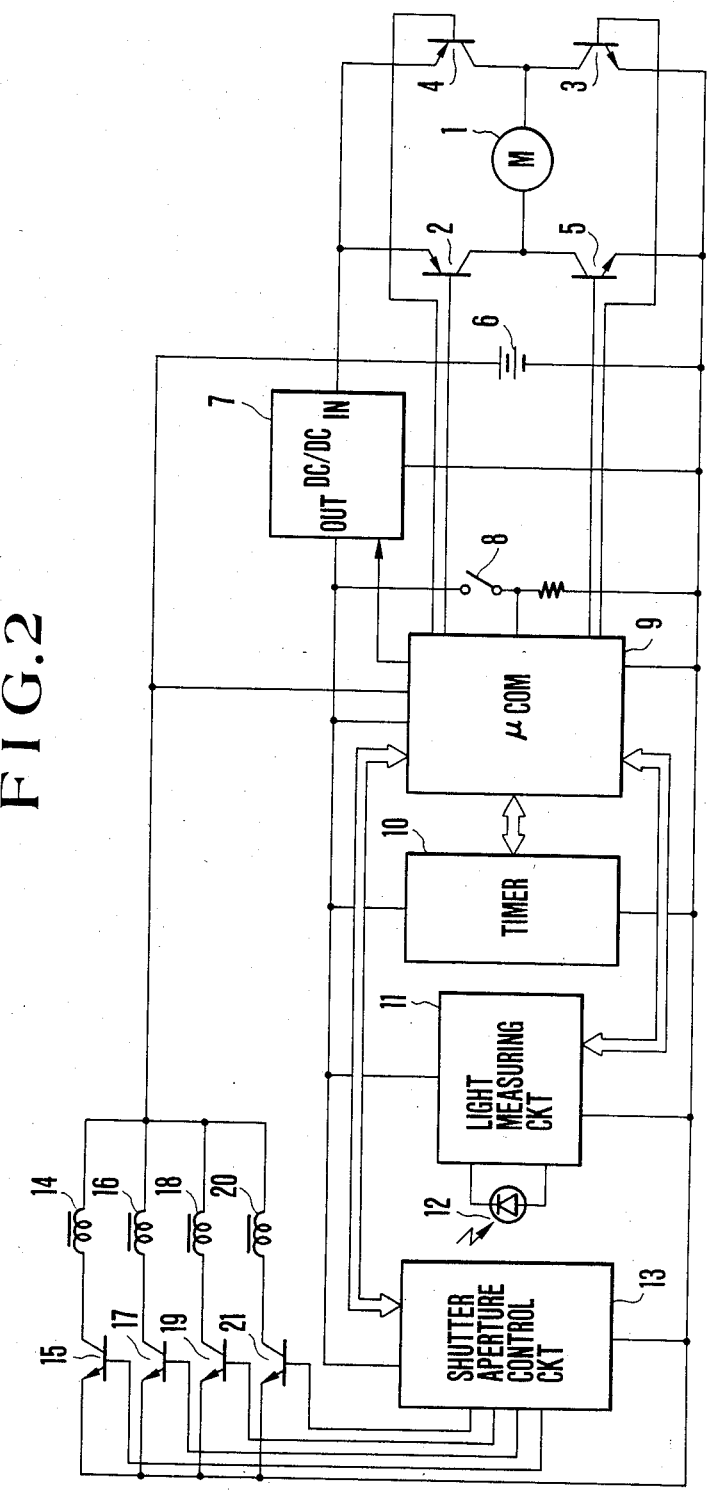
FIG. 2 shows the electronic circuit of the camera of the first embodiment of the present invention.

FIG. 2 shows an electronic circuit of the first embodiment of the present invention, whereby 1 is a motor for driving the transmission system for the feeding of film, namely film winding and rewinding, 2 and 3 are transistors to be switched on at the time of film winding, and 4 and 5 are transistors to be switched on at the time of film rewinding. The winding and rewinding of the film are changed over with the foward and backward rotation of the motor 1. Element 6 is a battery serving as the power source, 7 is a DC/DC converter serving as the voltage step-up circuit, 8 is a winding completion switch to be closed at the winding of every one frame of film, 9 is a micro-computer (hereinafter called $\mu$com.) for carrying out the sequence of the camera by a program, 10 is a programmable timer, 11 is a light measuring circuit having a light sensing element 12, 13 is a shutter aperture control circuit for controlling the shutter and the aperture by the signal of $\mu$com. 9, 14 is a magnet to be brought into a conductive state with the switching on of a transistor 15 to start the raising of the mirror, 16 is a magnet to be brought into a conductive state with the switching on of a transistor 17 to start the running of the leading shutter curtain, 18 is a magnet to be brought into a conductive state with the switching on of a transistor 19 to start the running of the tail shutter curtain, and 20 is a magnet for stopping the aperture at a proper position with the switching on of a transistor 21.

Figure 3:
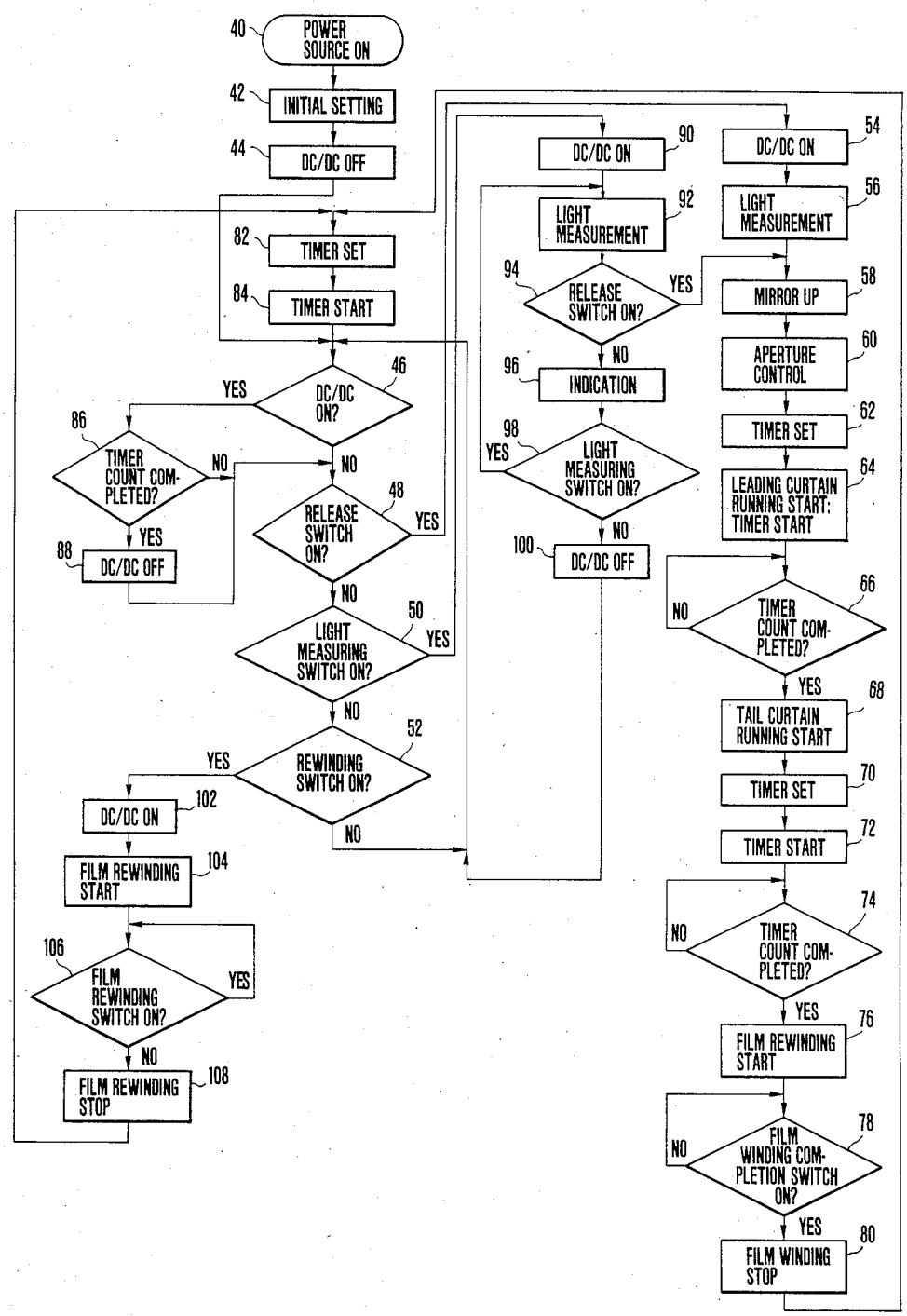
FIG. 3 is a time chart showing the operation of the circuit shown in FIG. 2.

The operation of the present embodiment will now be described with reference to the flow chart shown in FIG. 3.

First, the power source is switched on (step 40) to start the operation and carry out the initial setting (step 42), while the DC/DC converter 7 is switched off (step 44).

It is then judged as to whether the DC/DC converter 7 is switched on or off (step 46). If it is determined that the DC/DC converter 7 is switched off, whether the release switch (now shown) is switched on or off is then judged (step 48). Now, supposing that at this time the switch is not closed and also not being depressed, it is then judged whether the light measuring switch (not shown) is switched on or off (step 50) and then whether the rewinding switch (not shown) is switched on or off (step 52). In this state, the rewinding switch is naturally not closed, so whether the DC/DC converter 7 is switched on or off is judged (step 46). The above is repeated as long as any of the operation switches are closed, and therefore being depressed.

Now, let us suppose that the release switch is depressed to be closed (step 48). The DC/DC converter 7 is switched on (step 54) so actuate the light measuring circuit 11 and the shutter aperture control circuit 13. Then, the light is measured by the light measuring circuit 11 (step 56), and the shutter time and the aperture value are decided from the value obtained from the light measurement and the film sensitivity obtained from the film sensitivity setting dial (not shown). Then, the transistor 15 is switched on via the shutter aperture control circuit 13 so supply a current to the magnet 14 and raise the mirror (step 58). Then, when the shutter blade (not shown) which starts running at the same time as the rising of the mirror, reaches the aforementioned aperture value, a transistor 21 is switched on via the shutter aperture control circuit 13 to supply a current to a magnet 20 and stop the aperture (step 60). Then, the programmable timer 10 is set according to the shutter time (step 62) to start the operation, while the transistor 17 is switched on via the shutter aperture control circuit 13 to supply a current to the magnet 16 and start the running of the leading shutter curtain (step 64). After that, the programmable timer 10 is observed until it completes the counting (step 66), when the transistor 19 is switched on via the shutter aperture control circuit 13 to supply a current to the magnet 18 and start the running of the tail shutter curtain (step 68). Then the programmable timer 10 is set at a time needed until the running of the tail shutter curtain is terminated (step 70) to start the operation (step 72). The programmable timer 10 is observed until it completes the counting (step 74), and then the transistors 2 and 3 are switched on to supply a current to the magnet 1 and carry out the film winding (step 76). After that, the winding completion switch 8 is to be closed with the completion of the film winding and is observed until it is closed (step 78). When the transistors 2 and 3 are then switched off to stop the current supply to the motor 1 and to stop the film winding (step 80).

The programmable timer 10 is then set at a time which is sufficient for the voltage of the battery 6 to be restored up to the initial level after the motor has stopped and when there is no more load thereon (step 82), and starts the operation (step 84). Then it is judged whether the DC/DC converter 7 is switched on or off (step 46). Now, the DC/DC converter 7 which has been switched on before the release remains switched on. Now in case the DC/DC converter 7 is judged to be switched on, whether or not the programmable timer 10 has completed the counting is judged (step 86). Now let us suppose that the timer 10 has not yet completed the counting. Whether the release switch, the light measuring switch and the rewinding switch are switched on or off is judged in the same way as in the case of the initial operation (steps 48, 50 and 52) and when all of the switches are switched off, it is judged again as to whether the DC/DC converter 7 is switched on or off (step 46). Now let us suppose that the programmable timer 10 has completed the counting. Then, the DC/DC converter 7 is switched off (step 88) and whether the release switch, the light measuring switch, the rewinding switch and the DC/DC converter 7 are switched on or off is again judged (steps 48, 50, 52 and 46) until any of the switches are switched on. Further, at this time, the DC/DC converter 7 is switched off and the steps 48-52 are repeated in practice.

Now, let us suppose that the light measuring switch is switched on (step 50). Whether the release switch is switched on or off is judged (step 94) after the DC/DC converter 7 is switched on (step 90). When the converter 7 is switched on the operations starting from the above-mentioned raising of the mirror after step 58 are put into effect. When the converter 7 is switched off the light measurement information is displayed (step 96) and whether the light measuring switch is switched on or off is again judged (step 98). When the light measuring switch is judged (step 98) to be switched on, the light is measured again (step 92), whereby the DC/DC converter 7 is switched off (step 100) and the operations after step 46 are repeated.

Then, when the rewinding switch is switched on (step 52), by switching on the DC/DC converter 7 (step 102), and then the transistors 4 and 5, a current is supplied to the motor along the direction contrary to that at the time of the film winding to carry out the film rewinding (step 104). The rewinding operation of the motor 1 continues as long as the rewinding switch is judged to be switched on (step 106). When the rewinding switch is switched off, the transistors 4 and 5 are switched off to stop the current supply to the motor 1 and terminate the film rewinding (step 108). After the completion of the rewinding, the programmable timer 10 is set at a time sufficient for the voltage of the battery 6 to be restored up to the initial level after there is no more load on the motor 1 (step 82) and then starts to operate (step 84). When the programmable timer 10 is judged to have finished the counting (step 86), the DC/DC converter 7 is switched off (step 88).

Figure 4:
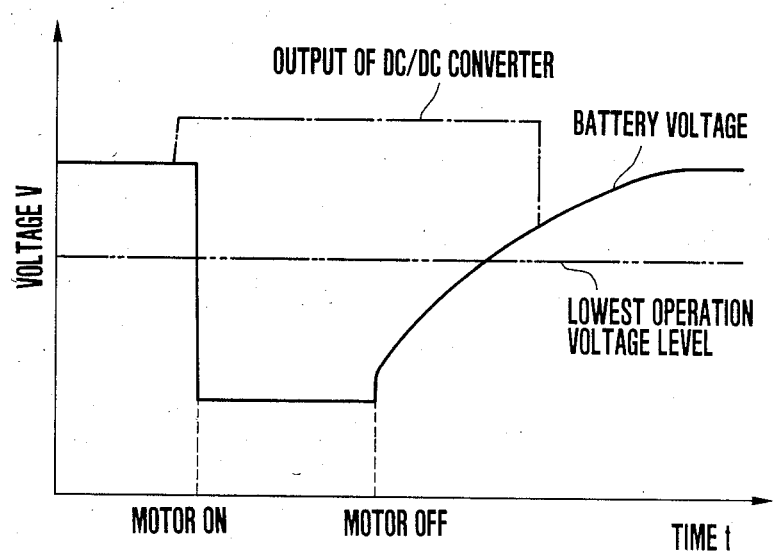
FIG. 4 is a graph showing the voltage fluctuation of the operation of the circuit shown in FIG. 2.

The role of the DC/DC converter 7 of the present embodiment will be explained with reference to the graph in FIG. 4. In the case of the motor 1 for film winding or rewinding, the voltage of the battery 6 falls down in the presence of a high load. When the capacity of the battery C is small, for example when designed for the sake of the compactness of the camera the voltage value often falls down due to the operation of the motor 1. These voltage drops go below the lowest operation voltage level of the electronic circuit in the $\mu$com. 9 and the like, which often leads to an erroneous operation of the circuit. Thus, according to the present embodiment, the DC/DC converter 7, serving as the voltage step-up circuit, is operated slightly before the motor 1 is operated for film winding or rewinding in order to supply the electronic circuit with a voltage stepped up at least above the lowest operation voltage level during the operation of the motor 1 in order to avoid such an erroneous operation. Further, in the present embodiment, the operation of the DC/DC converter 7 as the voltage step-up circuit, continues to operate for the period of time as set by the programmable timer 10 even after the stop of the motor 1. In order to avoid an erroneous operation, a voltage is always supplied to the electronic circuit to maintain it at a level which is above the lowest operation voltage level, by having the DC/DC converter 7 operate until the voltage of the battery assumes the value at least above the lowest operation voltage level after the stop of the motor 1, taking into consideration the time needed for the voltage of the battery to be restored up to the initial level after the stop of the motor 1. Normally, the voltage of the battery 6 is restored to the initial level instantly after the release of the load. However, where the level of the load is high for the capacity of the battery 6 or if the battery 1 is consumed, a considerable amount of time is needed for the voltage of the battery to be restored up to the initial level after the release of the load. According to the present embodiment, an erroneous operation will not occur even in the situations. This is very convenient in terms of the design of a compact camera as well as prolonging the battery life.

Further, in the present embodiment, the timing operation of the DC/DC converter 7 is set slightly before the operation of the motor 1 to make certain that the voltage level is maintained above the lowest operation voltage level, taking into account the delay in the rising up of the voltage step-up.

Further, in the present embodiment, the length of time for the operation of the DC/DC converter to continue after the stop of the motor 1 can either be set for the worst case, namely a case when the voltage needed for the battery 6 to be restored up to the lowest operation voltage level is large due to the consumption of the battery 6, or steppingly increased in accordance with the amount of time necessary for the recovery of the voltage of the battery 6 by counting the time lapse after the loading of the battery 6 by a counter or the like.

The second embodiment of the present invention will now be described with reference to FIGS. 6-9. The members having the same number as those in the first emodiment are the same members. Therefore, explanations thereof are omitted.

Figure 5:
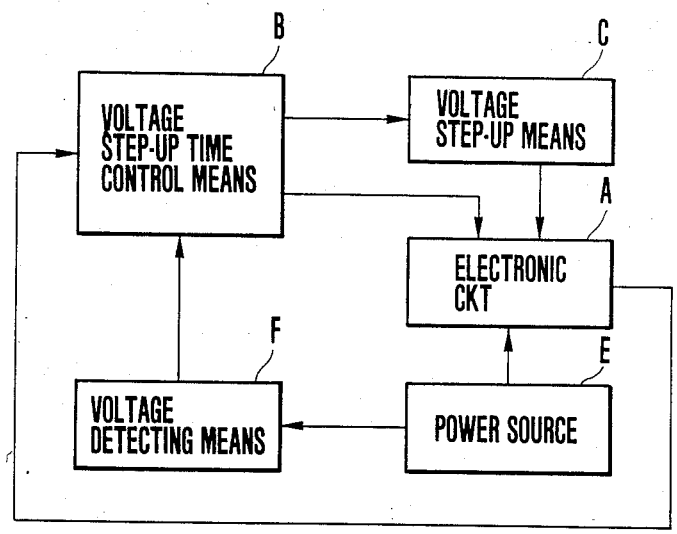
FIG. 5 is an efficiency block diagram showing the construction of a second embodiment of the present invention.

FIG. 5 is an efficiency block diagram showing the construction of the second embodiment of the present invention. The electronic circuit A for controlling the efficiency of the camera controls the operation of the motor for driving the film feeding system in such a manner that when the voltage value of the battery E falls down below a predetermined level due to the operation of the motor, the voltage step-up time control element B is ordered to start the voltage step-up. With this order, the voltage step-up time control element B operates the voltage step-up element C to supply the electronic circuit A with the stepped up voltage. After that, the voltage detecting element F detects that the voltage value of the battery E is restored up to a predetermined voltage level even after the motor stops due to the completion of the film feeding in such a manner that the voltage step-up time control element B continues to operate the voltage step-up element C until the proper voltage level is reached and after that stops the operation of the voltage step-up element C.

Figure 6:
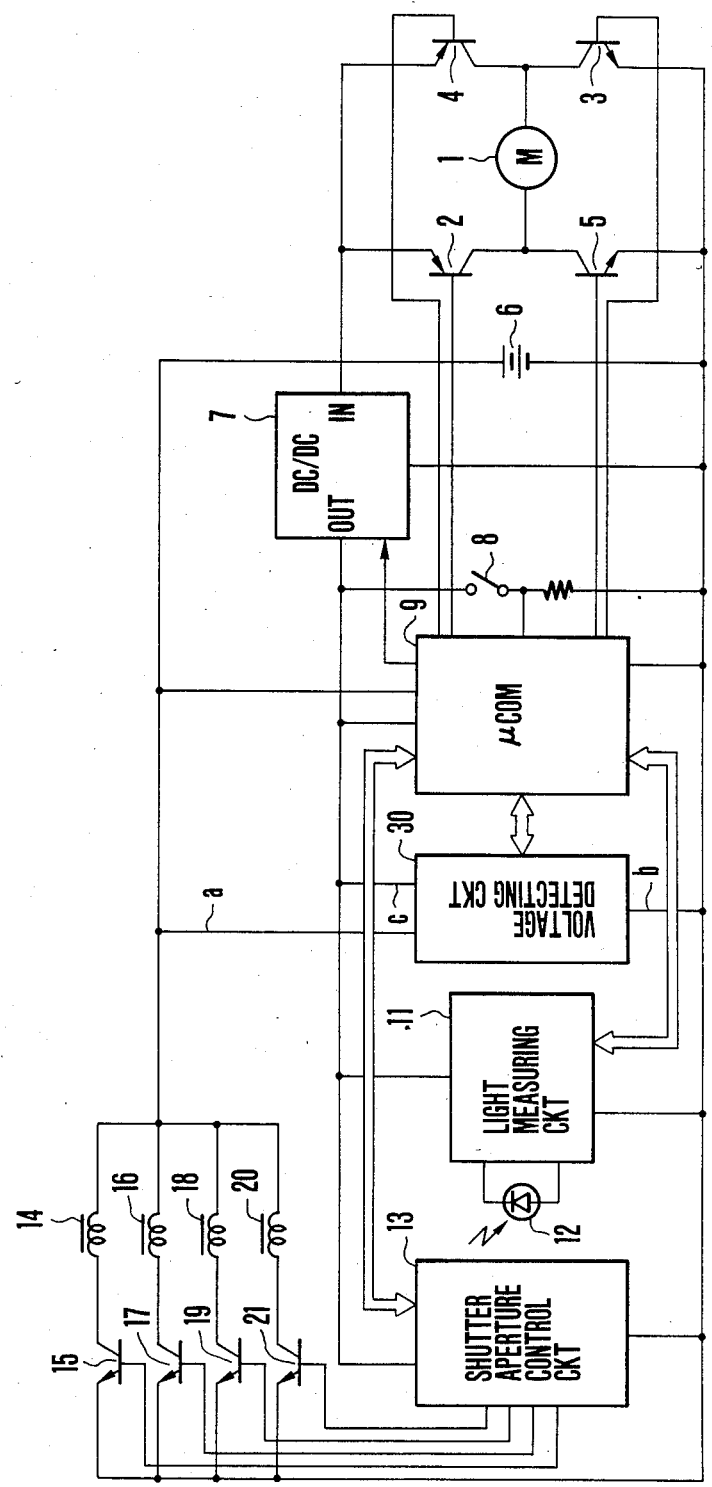
FIG. 6 shows the electronic circuit diagram of the camera as the second embodiment of the present invention.

FIG. 6 shows the circuit construction of the second embodiment of the present invention, whose construction is different from that of the first embodiment. Element 30 is a voltage detecting circuit. The voltage detecting circuit 30 will be described in detail with reference to the circuit diagram in FIG. 9.

Element D is a Zener diode for setting the voltage detecting level, R1–R3 are resistors for adjusting the detecting level, COM is a comparator, COU is a counter, I is an inverter and OSC is an oscillator circuit. Namely, by means of the Zener diode D and the resistors R1–R3, the voltage detecting level is set at a predetermined voltage level (FIG. 8) to which the voltage of the battery 6 should be restored after the release of the load. The comparator COM then delivers an H output when the voltage of the battery 6 reaches the predetermined voltage level. The H output from the comparator COM clears the reset of the counter COU via the inverter I. The counter COU receives the clock pulses $\phi 1$ from the oscillating circuit OSC to start the counting. Where the H output from the comparator COM continues for the set counter time, the H voltage detecting signal $\phi 2$ is delivered to the $\mu$com. 9. The feature of the voltage detecting circuit 30 of the present embodiment is that by using the counter COU the possibility of an erroneous detection is eliminated. Namely, although it is known that the voltage value takes a saw-tooth shape due to the influence of the operation of other circuits when the voltage of the battery 6 is restored, even if the voltage value fluctuates at the boundary of the predetermined voltage level for voltage detection, it is not acknowledged in the present embodiment that the battery 6 reaches the predetermined voltage level. Only when the voltage value is completely above the boundary is the H voltage detecting signal $\phi 2$ produced, to obtain a sure operation.

Figure 7:
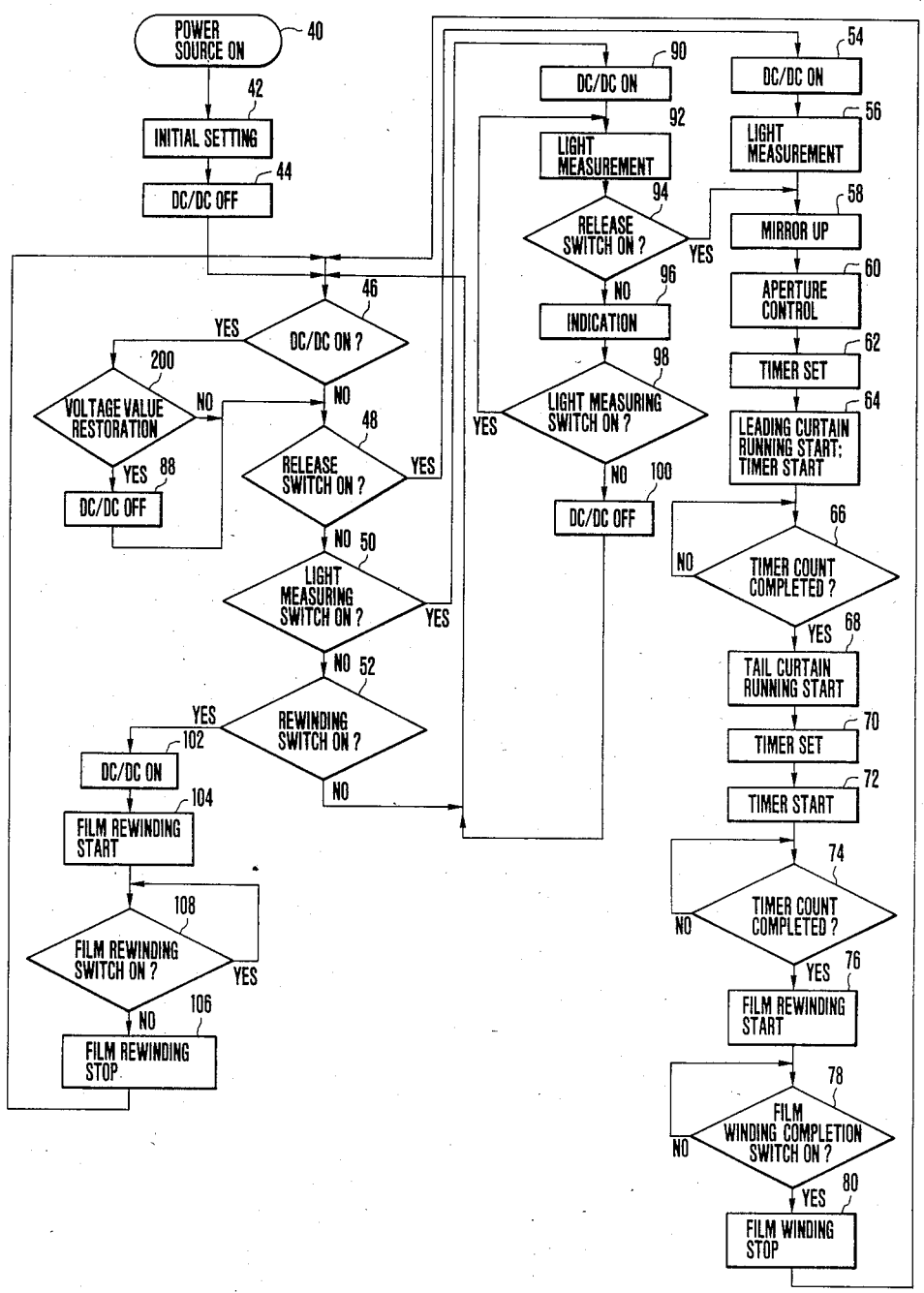
FIG. 7 is a time chart showing the circuit operation shown in FIG. 6.

The operation of the second embodiment will be now described with reference to the flow chart in FIG. 7.

The difference between the operation of the second embodiment and that of the first embodiment lies in the operation of step 200. Specifically, detection by the voltage detecting circuit 30 of whether or not the voltage value of the battery 6 is restored above a predetermined value by step 200 is determined. When detecting circuit 30 detects that the voltage value of the battery 6 is restored above the predetermined voltage level, the DC/DC converter remains opened and is switched off (step 88).

Figure 8:
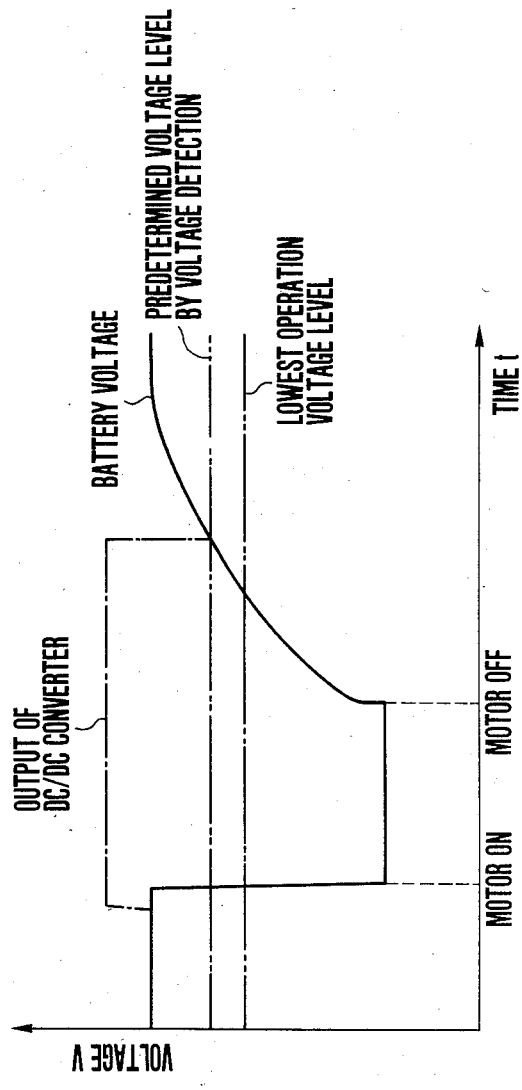
FIG. 8 is a graph showing the voltage fluctuation of the operation of the circuit shown in FIG. 6.
Figure 9:
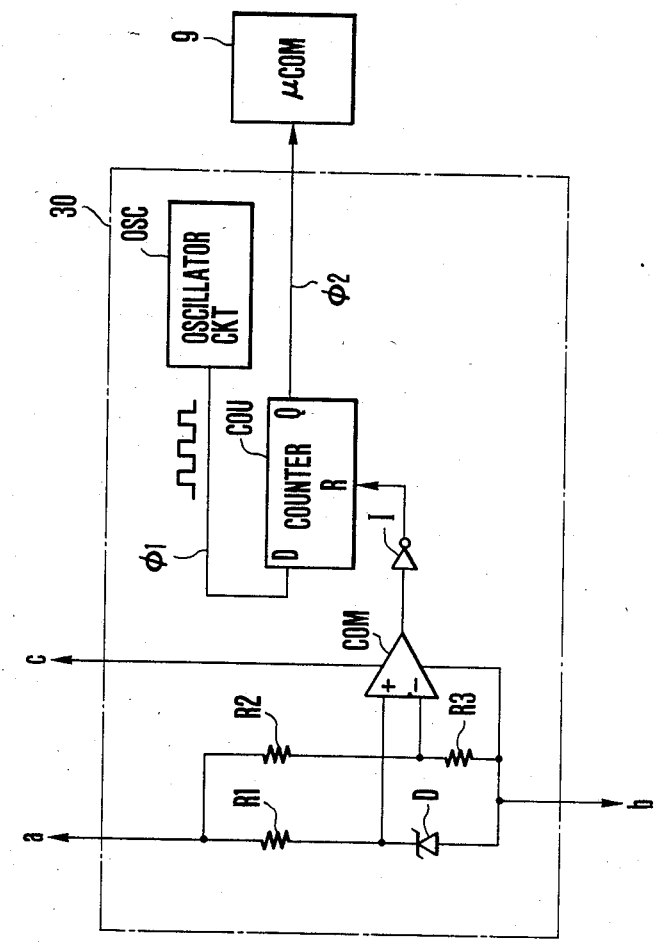
FIG. 9 shows the circuit diagram of the voltage detecting circuit shown in FIG. 6.

The role of the DC/DC converter 7 in the present embodiment will now be described with reference to the graph in FIG. 8. The voltage of the battery 6 becomes lower under a high load e.g., the motor 1 for film winding or rewinding. For example, if the capacity of the battery 6 is small as in a compact camera, the voltage often becomes lower than the lowest operation voltage of the electronic circuit such as the $\mu$com. 9 due to the operation of the motor 1, which often leads to an erroneous operation of the circuit. In the present embodiment, the DC/DC converter 7, as the voltage step-up circuit, is operated slightly before the start of the operation of the motor 1 to supply the electronic circuit with a voltage stepped up at least above the lowest operation voltage level even during the operation of the motor 1 to avoid such an erroneous operation. Further, in the present invention, the DC/DC converter 7 as the voltage step-up circuit continues operation, even after the stop of the motor, until the voltage value of the battery 6 is restored above the predetermined voltage value level. This is to always supply the electronic circuit with a voltage which is above the lowest operation voltage level in order to solve the problem of an erroneous operation. It is normal that the voltage value of the battery 6 is restored instantly up to the initial level after the release of the load. However, where the level of the load is higher than the capacity of the battery 6 or if the battery is consumed, it takes some time for the voltage of the battery to be restored up to the initial level after the release of the load. In the present embodiment, an erroneous operation of the electronic circuit will not occur even in the above situations, and thus it is convenient for use in a compact camera as well as for prolonging the life of the battery 6.

In the above-mentioned two embodiments a motor is built into the camera. However, it goes without saying that the present invention can be applied to an embodiment in which the motor construction is mountable on the camera body.

Further, in the above two embodiments, a motor is taken as the example of a high load construction in the camera. However, the present invention can also be applied to an object other than the motor which is acting as a high load for the power source.

As stated above, the present invention relates to a voltage control apparatus designed so that a voltage step-up element for the power source is provided in such a manner that when a high load construction such as a motor for operating the camera is driven, the electronic circuit for controlling the camera efficiency is supplied with the stepped up voltage through the operation of the voltage step-up element. After completion of the operation of the high load construction, the voltage step-up operation continues operation until the voltage of the power source is restored to the predetermined voltage value. The voltage step-up element is then stopped.

In the present invention, it is always possible to correctly operate the electronic circuit for controlling the efficiency of the camera. For example, in controlling the exposure, even when the voltage is decreased under a high load such as the motor without increasing the current consumption, as in a case when the capacity of the power source itself is small or the power source is consumed, it is different from other systems in which the voltage step-up element is operated continuously. This is convenient for use in a compact camera and contributes to the prolongation of the life of the power source because a normal operation can be obtained even when the power source has been consumed.

What is claimed is:

1. A voltage control apparatus for a camera comprising:
   (a) a power source having a voltage value;
   (b) a heavy load for changing the voltage value of the power source at the operation of the load;
   (c) an electronic circuit responsive to the source for controlling camera functions;
   (d) voltage step-up means for stepping up the voltage value of the power source; and
   (e) a control means for operating the voltage step-up means when the heavy load is operated and for continuing operation of the voltage step-up means for a predetermined period of time after the heavy load stops operation.

2. A voltage control apparatus according to claim 1, wherein the control means stops the operation of the voltage step-up means after said predetermined period of time.

3. A voltage control apparatus according to claim 2, wherein the control means includes timer means.

4. A voltage control apparatus according to claim 1, wherein the control means continues operation of the voltage step-up means until the voltage value of the power source is restored at least above a predetermined voltage value after the high load construction stops operation, and further includes means to then stop the operation of the voltage step-up means.

5. A voltage control apparatus according to claim 4, wherein the control means includes power source voltage detecting means.

6. A voltage control apparatus according to claim 4, further including means to hold the voltage value at the predetermined voltage value after the operation of the voltage step-up means is stopped.

7. A voltage control apparatus according to claim 1, wherein the heavy load comprises a motor.

8. A voltage control apparatus according to claim 7, wherein the motor comprises a film feeding motor.

9. A voltage control apparatus according to claim 1, wherein the electronic circuit includes a microcomputer system.

10. A voltage control apparatus according to claim 1, wherein the electronic circuit controls at least the exposure.

11. A voltage control apparatus according to claim 9, wherein the electronic circuit controls at least the exposure.

12. A voltage control apparatus according to claim 1, wherein the control means includes means for causing the operation of the voltage step-up means to start shortly before the start of the operation of the high load construction.

13. A voltage control apparatus according to claim 1, wherein the voltage step-up means comprises a DC/DC converter.

14. A voltage control apparatus according to claim 1, wherein the voltage step-up means supplies the electronic circuit with the stepped up voltage.

* * * * *

UNITED STATES PATENT AND TRADEMARK OFFICE
CERTIFICATE OF CORRECTION

PATENT NO.  : 4,561,754
DATED       : December 31, 1985
INVENTOR(S) : Shinichi Matsuyama It is certified that error appears in the above-identified patent and that said Letters Patent is hereby corrected as shown below:

In the heading of the Patent it should read:

-- [30]    Foreign Application Priority Data

Feb. 13, 1984 [JP]        Japan ........59-24684
    Mar. 7, 1984 [JP]         Japan ........59-44444 --

Signed and Sealed this

Fifth Day of August 1986

[SEAL]

Attest:

DONALD J. QUIGG

Attesting Officer      Commissioner of Patents and Trademarks